(12) United States Patent
Rehberg et al.

(10) Patent No.: US 8,190,423 B2
(45) Date of Patent: May 29, 2012

(54) WORD SENSE DISAMBIGUATION USING EMERGENT CATEGORIES

(75) Inventors: Charles Patrick Rehberg, Nashua, NH (US); Dawn Yvette Nordquist, Albuquerque, NM (US); Karl-Erik McCullough, McLean, VA (US)

(73) Assignee: Trigent Software Ltd., Bangalore (IN)

( * ) Notice: Subject to any disclaimer, the term of this patent is extended or adjusted under 35 U.S.C. 154(b) by 936 days.

(21) Appl. No.: 12/204,803

(22) Filed: Sep. 5, 2008

(65) Prior Publication Data

US 2010/0063796 A1 Mar. 11, 2010

(51) Int. Cl.
*G06F 17/21* (2006.01)
*G06F 17/27* (2006.01)
*G10L 11/00* (2006.01)

(52) U.S. Cl. .................. 704/9; 704/10; 704/270
(58) Field of Classification Search ............. 704/9, 10, 704/270
See application file for complete search history.

(56) References Cited

U.S. PATENT DOCUMENTS

| | | | | |
|---|---|---|---|---|
| 4,868,750 A * | 9/1989 | Kucera et al. | ............. | 704/8 |
| 4,965,763 A * | 10/1990 | Zamora | ............. | 704/1 |
| 5,146,405 A * | 9/1992 | Church | ............. | 704/9 |
| 5,243,520 A * | 9/1993 | Jacobs et al. | ............. | 704/9 |
| 5,541,836 A * | 7/1996 | Church et al. | ............. | 704/7 |
| 5,737,617 A * | 4/1998 | Bernth et al. | ............. | 704/1 |
| 5,794,050 A * | 8/1998 | Dahlgren et al. | ............. | 717/144 |
| 5,878,386 A * | 3/1999 | Coughlin | ............. | 704/10 |
| 5,930,788 A * | 7/1999 | Wical | ............. | 1/1 |
| 6,076,088 A * | 6/2000 | Paik et al. | ............. | 1/1 |
| 6,078,878 A * | 6/2000 | Dolan | ............. | 704/9 |
| 6,098,033 A * | 8/2000 | Richardson et al. | ............. | 704/1 |
| 6,405,162 B1 * | 6/2002 | Segond et al. | ............. | 704/9 |
| 6,631,346 B1 * | 10/2003 | Karaorman et al. | ............. | 704/9 |
| 6,714,905 B1 * | 3/2004 | Chang et al. | ............. | 704/9 |
| 6,728,707 B1 * | 4/2004 | Wakefield et al. | ............. | 1/1 |
| 6,732,097 B1 * | 5/2004 | Wakefield et al. | ............. | 1/1 |
| 6,732,098 B1 * | 5/2004 | Wakefield et al. | ............. | 1/1 |
| 6,738,765 B1 * | 5/2004 | Wakefield et al. | ............. | 1/1 |
| 6,741,988 B1 * | 5/2004 | Wakefield et al. | ............. | 707/741 |
| 6,768,935 B1 * | 7/2004 | Morgan et al. | ............. | 701/29.6 |
| 7,092,937 B2 * | 8/2006 | Morgan et al. | ............. | 707/736 |
| 7,136,807 B2 * | 11/2006 | Mueller | ............. | 704/9 |
| 7,275,033 B1 * | 9/2007 | Zhao et al. | ............. | 704/255 |
| 7,318,022 B2 * | 1/2008 | Li | ............. | 704/10 |
| 7,383,173 B2 * | 6/2008 | Mueller | ............. | 704/9 |
| 7,451,125 B2 * | 11/2008 | Bangalore | ............. | 706/47 |
| 7,487,094 B1 * | 2/2009 | Konig et al. | ............. | 704/270 |
| 8,099,281 B2 * | 1/2012 | Gleason | ............. | 704/260 |
| 2005/0049852 A1 * | 3/2005 | Chao | ............. | 704/9 |
| 2008/0221878 A1 * | 9/2008 | Collobert et al. | ............. | 704/232 |
| 2008/0270120 A1 * | 10/2008 | Pestian et al. | ............. | 704/9 |
| 2009/0063375 A1 * | 3/2009 | Bangalore | ............. | 706/12 |

* cited by examiner

*Primary Examiner* — Justin Rider
(74) *Attorney, Agent, or Firm* — Ash Tankha; Lipton, Weinberger & Husick (57) ABSTRACT

Disclosed herein is a computer implemented method and system for word sense disambiguation in a natural language sentence. The natural language sentence is parsed for identifying possible parts of speech for each term and identifying possible phrase structures. Terms comprising one or more linguistic roles are identified. The possible sense combinations for the terms with linguistic roles are identified. Emergent categories are applied to identify possible valid senses for each of the terms with identified linguistic roles. Linguistic role pairs are identified from among the terms identified with linguistic roles. The correspondence functions with the correspondence function types matching the identified linguistic role pairs are identified from an emergent categories database. The pair-wise senses for each term are compared with the identified linguistic roles to identify the possible sense combinations. The possible senses are inferred for each term with identified linguistic roles in the natural language sentence and previous sentences.

15 Claims, 4 Drawing Sheets

WORD SENSE DISAMBIGUATION USING EMERGENT CATEGORIES

CROSS REFERENCE TO RELATED APPLICATIONS

1. Co-pending application titled "Automatic Pattern Generation in Natural Language Processing".

BACKGROUND

This invention, in general, relates to computational linguistics, and specifically relates to word sense disambiguation using categorization of senses.

Word senses, in linguistics, refer to the different meanings of a word in a dictionary. Each sense of the word is potentially relevant in a sentence based on the context of the word usage in the sentence. In computational linguistics, word sense disambiguation (WSD) is the problem of determining the correct sense of the word in a given sentence. For example, consider the word "bass", having two distinct senses namely:
"a type of fish" and
"tones of low frequency".
Also consider two sentences with the same word but different senses:
"I went fishing for some sea bass;" and
"The bass part of the song is very moving."
A human may clearly identify that the first sentence is using the word "bass" in sense 1 above, and that the second sentence is using sense 2. Although identifying senses by reading sentences seems obvious to a human, developing algorithms to replicate the human ability is a difficult task.

Hence, there is a need for a computer implemented method and system for word sense disambiguation in a natural language sentence with acceptable accuracies.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

Disclosed herein is a computer implemented method and system for word sense disambiguation in a natural language sentence. The method and system disclosed herein determines the sense of a term in the natural language sentence through a process of elimination of senses. The natural language sentence is parsed for identifying possible parts of speech for each term in the natural language sentence. Further, the natural language sentence is parsed for identifying possible phrase structures i.e., sentence constituents, for example, noun phrase, verb phrase, prepositional phrase, etc. are identified. Terms comprising one or more linguistic roles are identified. The possible sense combinations for the terms with linguistic roles are identified. Emergent categories are applied to identify possible valid senses for each of the terms with identified linguistic roles. Each emergent category identifies a set of senses for the terms in a dictionary. The senses in one emergent category correspond to the senses in another emergent category by a correspondence function.

An emergent categories database comprising a multiple correspondence functions is provided. Each of the correspondence functions comprises a given correspondence function type that identifies two emergent categories. The correspondence function type specifies a linguistic role pair. The linguistic role pair is a pairing of two linguistic roles for example, verb-object, subject-verb, etc. The senses in each of the two emergent categories play one of the linguistic roles in the correspondence function type. Linguistic role pairs are identified from among the terms identified with linguistic roles in the natural language sentence. The correspondence functions with the correspondence function types matching the identified linguistic role pairs are identified from the emergent categories database. For each linguistic role pair, the emergent categories identified by the correspondence function, are valid for the corresponding linguistic roles. Each of the emergent categories specifies one or more senses representing a term matching the corresponding identified pair-wise term in the natural language sentence. Each sense in one of the emergent categories in the identified correspondence function is a possible valid pair-wise sense for the term in the natural language sentence when paired with the other emergent category in the identified correspondence function. The pair-wise senses for each term are compared with the identified linguistic roles to identify the possible sense combinations. The possible senses are inferred for each term with identified linguistic roles in the natural language sentence and previous sentences.

The step of inferring the possible senses for each term further comprises reducing the possible senses for each term with identified linguistic roles in the natural language sentence. The senses for the term identified with linguistic roles that are not consistent with identified sense mappings for the same term in previous sentences are eliminated. The step of inferring further comprises reducing the possible senses for each term with identified linguistic roles in the previous sentences. The senses for the term that are not consistent with identified sense mappings for the same term in subsequent sentences are also eliminated.

References to "word" includes "multi-word terms", that when taken together have one or more senses in a dictionary. The dictionary is a reference that contains words where each word has one or more senses. An "Equivalent Name Set" (ENS) is a set of senses which are considered to have the same meaning or nearly the same meaning for the purpose of the invention. The set of senses in the ENS is analogous to synonyms for a term.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

The definitions of the technical terms used herein are provided below.

Declared pattern (DP): A DP is a sequence of pattern units, each of which corresponds to a portion of text in a natural language sentence 201 and identifies the possible linguistic role 210, for example, subject, verb, direct object, etc. in the natural language sentence 201. A DP is a mapping between natural language grammar and semantic items in the conceptionary 218.

Pattern unit (PU): A pattern is a relative sequence of pattern units. A PU is a mapping between a role in a natural language sentence 201 and its equivalent name set.

Conceptionary 218: A conceptionary 218 is a language independent representation of an ontology. The conceptionary 218 is a knowledge representation of items. The items represent concepts, instances, relationships, characteristics, values, units of measure, and manner of sets and aggregations of the items.

Equivalent name set (ENS) 204a: Identifies a set of senses for words which mean the same and also provides a set of words that have the same meaning for a given language. For a given language, each semantic item maps to a single ENS 204a. The ENS 204a contains multiple items, i.e., multiple entries. The ENS 204a is a set of senses. Each sense 212 has a term 209 name. Since each sense 212 in the ENS 204a is referred to by the term 209, the set is referred to as "Equivalent Name Set" 204a.

Equivalent pattern specification (EPS) 207 sets: EPS 207 sets for a given language represents different ways of saying the same thing. An equivalent pattern (EP) is a sequence of pattern units. A PU specifies the linguistic metadata (LMD) 202 needed to match a term 209 in a language. An EPS 207 is a set of EP where each EP represents grammatically different ways that possibly represent the same semantics. The EP in an EPS 207 has the same number of PU representing an occurrence of an ENS 204a. Each EPS 207 has a meaning map that describes a single semantic pattern involving one or more of the PU in the EP. EPS 207 sets are described in co-pending application titled "Automatic Pattern Generation in Natural Language Processing" and are used to identify the candidate roles of terms in the natural language sentence 201.

Emergent categories (EC): An EC is a set of ENS 204a that are used to determine which sense 212 of the word or phrase is valid in the natural language sentence 201 relative to other words or phrases of the natural language sentence 201.

Correspondence function (CF) 211: Identifies a relationship between two senses, where the relationship has a linguistic correspondence. A CF 211 identifies a correspondence involving two ENS 204a or EC each with a different linguistic role 210. Roles include; subject, transitive verb, intransitive verb, linking verb, direct object, indirect object, etc. A CF 211 asserts that when each ENS 204a fills the identified linguistic roles, that combination of ENS 204a is considered to be semantically valid.

Parts of speech tagger 402a: The parts of speech tagger 402a is a unit that determines the part of speech of the different terms of the natural language sentence 201 as noun, verb, preposition, etc.

Sentence chunker 402b: A sentence chunker 402b applies a natural language process to separate and segment sentences into its sub constituents, including: noun phrases, verb phrases, prepositional phrases, etc.

Figure 1:
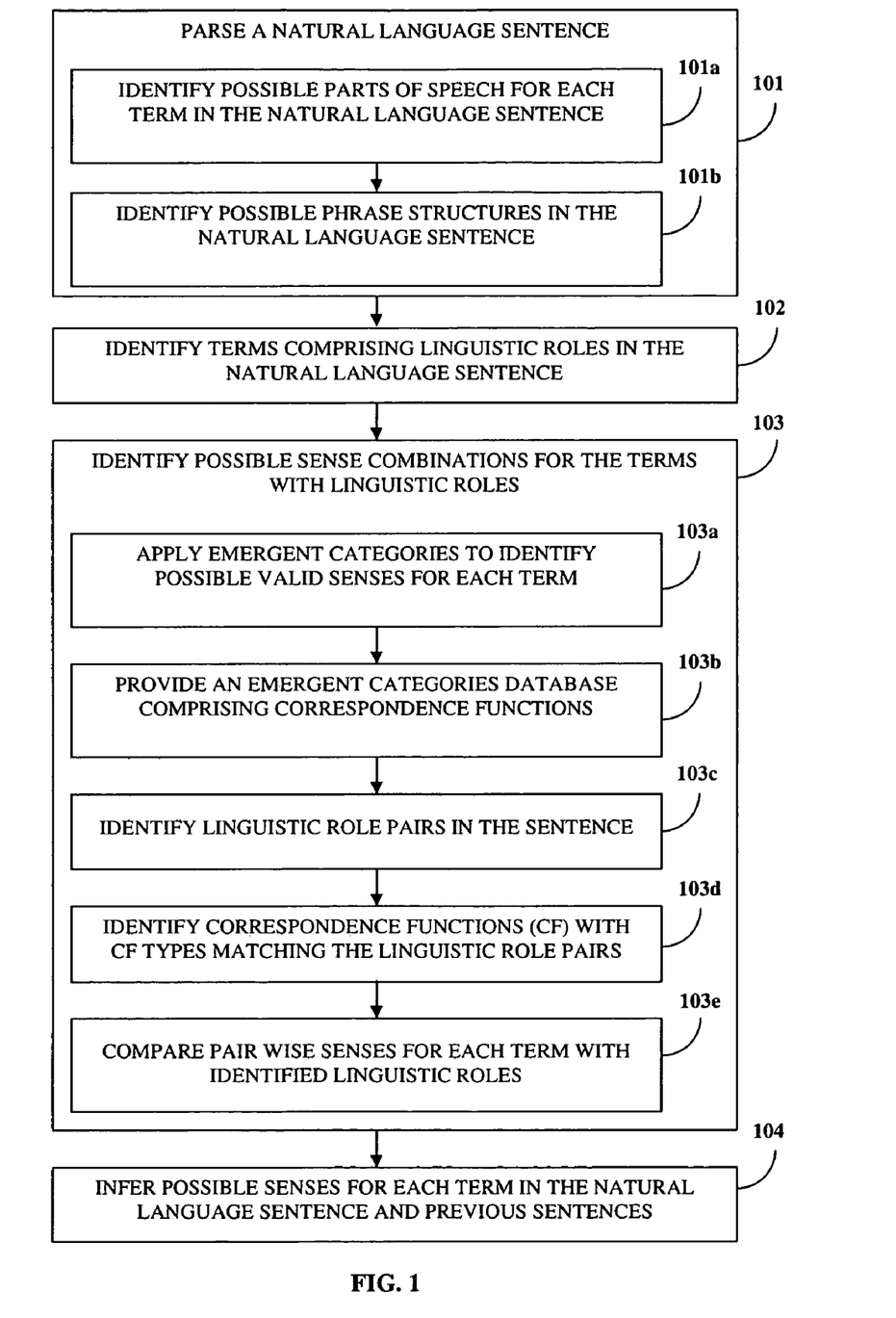
FIG. 1 illustrates a computer implemented method of word sense disambiguation in a natural language sentence.

FIG. 1 illustrates a computer implemented method for word sense disambiguation in a natural language sentence 201. The computer implemented method disclosed herein comprises determining the sense 212 of a term 209 in the natural language sentence 201 through a process of elimination of senses. The natural language sentence 201 is parsed 101 using a natural language sentence parser 402 further comprising the step of identifying 101a one or more possible parts of speech (POS) for each term 209 in the natural language sentence 201. One or more possible phrase structure are also identified 101b for the natural language sentence 201, i.e., sentence constituents for example, noun phrase, verb phrase, prepositional phrase, etc. are identified. Terms comprising one or more linguistic roles in the natural language sentence 201 are identified 102 for example, subject, direct object, indirect object, etc. Further, possible sense 212 combinations for the terms with linguistic roles are identified 103 in the natural language sentence 201. Emergent categories (EC) are applied 103a to identify possible valid senses for each of the terms in the natural language sentence 201 with identified linguistic roles.

Each emergent category identifies a set of senses for terms in a dictionary 205. The senses in one emergent category correspond to senses in another emergent category by a correspondence function 211.

An EC database 206 comprising correspondence functions is provided 103b. Each of the correspondence functions comprises a given correspondence function type 303 that identifies two EC. The correspondence function type 303 specifies a linguistic role pair. The linguistic role pair is a pairing of two linguistic roles for example, verb-object, subject-verb, etc. The senses in each of the two EC play one of the linguistic roles in the correspondence function type 303. Linguistic role pairs are identified 103c from among the terms identified with the linguistic roles in the natural language sentence 201. The correspondence functions with the correspondence function types matching the identified linguistic role pairs are identified 103d from the EC database 206. For each linguistic role pair, the EC identified by the correspondence function 211 are valid for the corresponding linguistic roles. Each of the EC specifies one or more senses representing a term 209 matching the corresponding identified pair-wise term in the natural language sentence 201. Each sense 212 in one of the EC in the identified correspondence function 211 is a possible valid pair-wise sense for the term 209 in the natural language sentence 201 when paired with the other emergent category in the identified correspondence function 211. The pair-wise senses for each term 209 are compared 103e with the identified linguistic role 210 in the natural language sentence 201 to identify the possible sense 212 combinations. The possible senses are inferred 104 for each term 209 with identified linguistic role 210 in the natural language sentence 201 and in previous sentences.

The step of inferring the possible senses for each term 209 further comprises reducing the possible senses for each term 209 with identified linguistic role 210 in the natural language sentence 201. The senses for the term 209 identified with linguistic role that are not consistent with identified sense 212 mappings for the same term 209 in previous sentences are eliminated. The inferring step further comprises reducing the possible senses for each term 209 with identified linguistic role 210 in previous sentences. The senses for the term 209 that are not consistent with identified sense 212 mappings for the same term 209 in subsequent sentences in the document being examined are also eliminated.

A linguistic role pair is a pairing of two roles including subject-verb, verb-direct object, verb-indirect object, and target of preposition-<prep:pclass>-object of preposition. Here "prep" is a preposition and "pclass" identifies a classification of the association for the preposition, including location, time, relationship, characteristics, values, and units of measure (CVU), subset, and scope.

The sense 212 of a given term 209 in the natural language sentence 201 is determined through a process of elimination as described in the following steps below:

1. Generating a list of the senses in the dictionary 205 for the word.
2. Eliminating the senses that do not match the required POS. The required POS may be determined by POS tagger 402a software.
3. If more than one word sense 212 remains, eliminating the senses that do not match any grammatically required gender, number, tense, formality, or any other known LMD 202 by consulting the dictionary 205 enriched with LMD 202.
4. If more than one word sense 212 remains, continuing the process of elimination by examining specific word sense 212 combinations in a given sentence to determine whether the sense 212 combinations correspond to known valid combinations. For a human, a word combination appears valid as a result of being told, through direct experience, or through another process wherein the human may make a "guess" based on an understanding derived from what was previously told, previously experienced, or previously guessed correctly about the word. In this step, the senses that are known to be valid are retained. EC are used to implement step 4.
5. If more than one word sense 212 remains, identifying the closest word sense 212 based on what is known about the word senses discussed in the document being parsed. The currently discussed word senses are those found in sentences that come before the current natural language sentence 201.
6. If more than one word sense 212 remains, identifying the closest word sense 212 based on what may be known about the word senses discussed in the document based on the sentences that come after current natural language sentence 201. The decision of selecting a word sense 212 may be delayed, and resolved by returning to the decision after further reading.
7. If more than one word sense 212 remains, the remaining word senses are more or less equally possible within the current natural language sentence 201. The remaining word senses should be considered valid within this natural language sentence 201. However, considerations of global context may be applied, if available, to further restrict the word senses.

When a term 209 in the dictionary 205 is encountered, other information about the term 209 is generally known. The other information includes the senses for the word and their associated gender, tense, number, POS, word class for example, a pronoun. For each sense 212, the synonyms or membership in ENS 204a is also known. This previously known information may be exploited to select the appropriate sense 212 for the term 209 in the natural language sentence 201. However, occasionally, a term 209 is encountered that is neither in the dictionary 205 nor does the POS match any sense 212 for the term 209 found in the dictionary 205. There may be two possibilities:

1. The POS has been erroneously assigned;
2. The sense 212 is a previously unknown sense 212 of the term 209.

In either case above, a dictionary entry may be created indicating the POS, and adding the newly created sense 212 to word class "new". Subsequent curation of the dictionary 205 should follow the process of verifying and completing new senses.

The computer implemented method for word sense disambiguation using EC requires a set of basic linguistic preprocessing of each natural language sentence 201 such as:
1. Parsing the natural language sentence 201:
    Two methods for parsing the natural language sentence 201 are described as follows:
    Method A:
    1. Using the POS tagger 402a to determine the POS for each term 209.
    2. Using the sentence chunker 402b to determine the phrase structure of the natural language sentence 201.
    Method B:
    Method B comprises using the LMD 202 and the sentence chunker 402b to yield possible POS taggings.
    1. Using LMD 202 and the sentence chunker 402b to determine POS for each term 209 further comprises:
        a. Using LMD 202 to identify POS possibilities;
        b. Using the sentence chunker 402b to eliminate POS possibilities based on the structure of the grammar;
    2. Using the sentence chunker 402b to determine phrase structure.
2. Removing coordinating conjunctions (CC): Removing CC comprises considering the sentence structure surrounding the CC to construct a sequence of simple sentences. A simple sentence generated does not contain CC. A CC operates to coordinate noun phrases (NP), preposition phrase (PP), verb phrases (VP), clauses, adjectival phrase (ADJP), and adverbial phrase (ADVP). Multiple patterns of CC may exist in the natural language sentence 201. The following steps describe removal of CC for each pattern of CC. Also, the following symbols are used when describing patterns:
    <pre>=for previous sentence contents; and
    <post>=for remaining sentence contents.
    a) Coordinated noun phrase (NP): The pattern is represented as <pre> $NP_1$ CC $NP_2$ <post>
    By removing the CC, the pattern results in simple sentence patterns:
        <pre> $NP_1$ <post>
        <pre> $NP_2$ <post>
    Consider an example for determining the coordinated NP in the natural language sentence 201 "Joe and Bob went to the store." By using POS tagging and LMD 202 lookup, the natural language sentence 201 results in: NOUN(Joe) CC(and) NOUN(Bob) (VBD)(went) PREPOSITION(to) DET(the) NOUN(store). VBD is an abbreviation for "VERB with ED ending" and includes all past tense verbs, for example, the verb "proposed". VBD may also include past tense verbs that do not have "ED" ending, for example, "went". In the aforementioned example, DET is used as an abbreviation for "DETERMINER".
    Chunking may be used to identify the phrases, resulting in: NP(Joe) CC(and) NP(Bob) VP(went) PP(to the store). In the example natural language sentence 201,
    <pre>=null
    <post>=went to the store.
    Thus by removing the CC, the following simple sentences are generated:
    Joe went to the store.
    Bob went to the store.
    b) Coordinated preposition phrase (PP): The pattern is represented as <pre> Prep X CC Y< post>
    By removing the CC, the pattern results in simple sentence patterns:
        <pre> Prep X <post>
        <pre> Prep Y <post>

Consider an example for determining the coordinated PP in the natural language sentence 201 "Joe went to the store and bakery on Tuesday."
By removing the CC, the following simple sentences results:
Joe went to the store on Tuesday.
Joe went to [the] bakery on Tuesday.
If the CC is removed with the same approach used for the coordinated NP in case (a), the resulting <pre>="Joe went to the" and <post>="on Tuesday". Also, $NP_1$="the store" and $NP_2$="bakery". By removing CC and combining other elements results in two simple sentences:
Joe went to the store on Tuesday.
Joe went to [the] bakery on Tuesday.
c) Coordinated verb phrase (VP): The pattern is represented as <pre> $VP_1$ CC $VP_2$ <post>
By removing the CC, the pattern results in simple sentence patterns:
<pre> $VP_1$ <post>
<pre> $VP_2$ <post>
Consider an example for determining the coordinated VP in the natural language sentence 201 "Joe gave and received the ball."
By removing the CC, the following simple sentences results:
Joe gave the ball.
Joe received the ball.
d) Coordinated clauses (compound sentence): The pattern is represented as <pre> [','] CC <post>,
where <pre> and/or <post> are compound sentences (clauses).
By removing the CC, the pattern results in simple sentence patterns:
  <pre>
  <post>
Consider an example for determining the coordinate clauses in the natural language sentence 201 "Joe bought a car, and Jane sold a house."
In this example, both <pre> and <post> are clauses
The above example sentence has the phrase pattern: $NP_1$ $VP_1$ $NP_2$, CC $NP_3$ $VP_2$ $NP_4$
By removing the CC, the following simple sentences results:
  $NP_1$ $VP_1$ $NP_2$="Joe bought a car."
  $NP_3$ $VP_2$ $NP_4$="Jane sold a house."
Consider another natural language sentence 201, for example, "Joe bought a car, and sold his house."
In this example <pre> is clause and <post> is not. Therefore, the subject of the clause <pre> is identified and made the subject of the <post>.
The phrase pattern of the example SUB(NP1) VP1 NP2, CC VP2 NP3 results in:
SUB(NP1) VP1 NP2=Joe bought a car.
SUB(NP1) VP2 NP3=Joe sold his house.
e) Coordinated adjectival phrase (ADJP): The pattern is represented as <pre> $ADJP_1$ CC $ADJP_2$ <post>
By removing the CC, the pattern results in simple sentence patterns:
  <pre> $ADJP_1$ <post>
  <pre> $ADJP_2$ <post>
Consider an example for determining the coordinated ADJP in the natural language sentence 201 "The fat and ugly man sat down."
By removing the CC, the following simple sentences results:
The fat man sat down.
The ugly man sat down.

f) Coordinated adverbial phrase (ADVP): The pattern: <pre> $ADVP_1$ CC $ADVP_2$ <post>
By removing the CC, the pattern results in simple sentence patterns:
  <pre> $ADVP_1$ <post>
  <pre> $ADVP_2$ <post>
Consider an example for determining the coordinated ADVP in the natural language sentence 201 "The man ate quickly and messily."
By removing the CC, the following simple sentences results:
The man ate quickly.
The man ate messily.

3. Substituting pronouns: By keeping track of the LMD 202, such as gender and number for previous and most recent subject and objects, the pronouns may be substituted with non-pronoun terms. A few pronoun substitution rules may apply as follows:
   a. If the pronoun appears in the subjective position of the natural language sentence 201, find the previous subject or object with the same gender and number.
   b. If a plural pronoun appears, then a group of subjects or objects that has been previously specified may be substituted for the pronoun. However, before the pronoun substitution, removal of coordinating conjunctions may be required.
   c. If the pronoun appears in the objective position, find the previous subject or object with the same gender and number.
   The application of the above rules may result in more than one possible substitution and may be filtered subsequently in the EC in subsequent steps. Any other appropriate method for pronoun substitution may also be used.

4. Identifying the terms with linguistic roles, for example, subject, direct object, indirect object, etc: EPS 207 is used to identify linguistic roles. The EPS database is searched for patterns that match the phrase structure of the natural language sentence 201. The patterns are based on identifying the single tensed verb cluster, i.e. the main verb phrase in the natural language sentence 201. As a result, a sentence input produces simple sentences with a single verb phrase. The EPS 207 patterns found as matching the sentence structure identify the subject, direct object, and indirect object in the natural language sentence 201 as appropriate.
   The computer implemented method for word sense disambiguation does not depend on any specific method to identify the linguistic roles in the natural language sentence 201. Linguistic roles may be identified manually or through other processes.

5. Using EC to identify the senses for each term 209 with the identified linguistic role:
   If only one sense 212 matches the POS or other LMD 202 of the term 209, then chose that sense 212 for the term 209. Determine whether there is an EC with the correspondence function 211 for the sense 212 in the EC DB 206. If there does not exist an EC with the correspondence function 211, then add the EC with the correspondence function 211 to the EC DB 206.
   Use of EC to choose among the sense 212 possibilities is described in the following steps:
   a. Determining the correspondence function-based pairwise matching of terms in the natural language sentence 201 such as:
      "Term for role A" ←CF type 303→ "Term for role B"

For example, consider the natural language sentence 201 "Joe took his medicine." The following CF 211-based pair-wise matching of terms may be obtained.

"Joe" ←Subject-Verb→ "took"

"took" ←Verb-Object→ "medicine"

b. For each CF 211, finding the EC for the terms in role A and role B respectively, where the term 209 in the natural language sentence 201 matches an ENS entry 301 in an ENS 204a belonging to an EC. For example, suppose when the EC DB 206 is searched for CF 211 of subject-verb, the following results may be found:

If the EC with role A "Joe" has ENSes:
  i. ENS1=a male individual
  ii. ENS2=Individual named "Joe
Then the EC with role B "took" has ENSes:
  iii. ENS3=To steal
  iv. ENS4=To ingest Similarly, when the EC DB 206 is searched for CF 211 of verb-object, the following results may be found:

When the EC with role A "took" has ENS3="To steal", then the EC with role B "medicine" has ENS5="medication".

When the EC with role A "took" has ENS4="To ingest", then the EC with role B "medicine" has ENS5="medication".

c. The natural language sentence 201 may have two terms with two possible senses. The natural language sentence 201 may mean:

"Someone named Joe ingested his medication";
"Some male individual ingested his medication";
"Someone named Joe stole his medication";
"Some male individual stole his medication".

If the EC DB 206 also had verb-object mappings such as "took" with the sense 212 of "to receive" and "medicine" with sense 212 of "punishment/consequences", another possible mapping is:

"Joe received his punishment."

Other correct sense 212 assignment may apply which is not yet known to the word sense disambiguation system 401. The other assignments may be discovered as the text is parsed further or based on mappings from previous sentences.

6. Identifying the terms with linguistic roles such as "target of preposition" (TOP) and "object of preposition" (OOP) for each preposition:

Each preposition in the natural language sentence 201 is identified. Infinitives, such as "to sleep", are excluded. The noun phrase following the preposition is identified. The head of the noun phrase following the preposition is identified. The head of the noun phrase following the preposition is the object of the preposition (OOP). Following is a reasonable set of TOP identification rules:

a. If the phrase structure is: Sub Verb-Be prep OOP, then TOP=Sub;

b. If the phrase structure is: Sub Verb prep OOP, then TOP=Verb;

Note OOP may also be DO or IDO in the natural language sentence 201.

c. If the phrase structure is: Sub Verb DO prep OOP, then TOP=Verb;

d. If the phrase structure is: Prep OOP Sub Verb, then TOP=Verb;

e. If the phrase structure is: Prep OOP Sub Verb-Be, then TOP=Sub;

f. If the phrase structure is: Sub Verb-Be prep $OOP_1$ prep $OOP_2$, then $TOP_1$=Sub;
$TOP_2$=$OOP_1$;

g. If the phrase structure is: Sub Verb prep $OOP_1$ prep $OOP_2$, then $TOP_1$=Verb;
$TOP_2$=Verb;

Any other approach may be used for identifying the terms with linguistic roles of OOP and TOP.

7. Using EC to identify the sense 212 for each term 209 with the linguistic role 210 of TOP or OOP: Consider the natural language sentence 201, "Joe took his medicine with water." There exists the correspondence function 211 "TOP-with-OOP" in:

"took" ←TOP-with-OOP→ "water"

When the EC DB 206 is searched for CF 211=TOP-with-OOP, the result found is:

When the EC with role A "took" has ENS1="To ingest", then the EC with role B "water" has ENS7="H2O as liquid".

If no other EC is found, then the only sense 212 for the term 209 "took" is "to ingest". Therefore the natural language sentence 201 is interpreted as:

"Someone named Joe ingested his medication."
"Some male individual ingested his medication."

8. Using EC to identify the sense 212 of the term 209 based on previous and succeeding sentences: As the document is parsed sentence-by-sentence, a history of possible CF 211 patterns and their search results thus far is assembled. The sense 212 mappings of each successive sentence are checked against the mappings from previous sentences. Any inconsistent sense 212 mappings in both the current and past sentences may be eliminated. The sense 212 mappings that yield the least unknown senses may be preferred.

Consider an example of word sense disambiguation using the method described in FIG. 1 for the sample sentence "The man on the stand lit a fire."

The term 209 "man" comprises the following possible LMD 202 in the dictionary 205:

1. POS=Noun;
   a. An adult male human.
   b. A mensch; a person of integrity and honor.
   c. An abstract person; any man or woman.
   d. All humans collectively; mankind. Also man.
   e. A piece or token used in board games such as chess.
2. POS=Verb;
   a. (transitive) To supply with staff or crew of either sex.
   b. (transitive) To take up position in order to operate something.
3. POS=Interjection;
   a. An interjection used to place emphasis upon something or someone.

The term 209 "light" or lights, lighting, lit, lighted, etc. comprises the following possible LMD 202 in the dictionary 205:

1. POS=Verb;
   a. To start a fire.
   b. To illuminate.
2. POS=Noun;
   a. (uncountable) The natural medium emanating from the sun and other very hot sources now recognized as electromagnetic radiation with a wavelength of 400-750 nm, within which vision is possible.
   b. A source of illumination.
   c. Spiritual or mental illumination; enlightenment, useful information.
   d. A notable person within a specific field or discipline.

e. A point of view, or aspect from which a concept, person or thing is regarded.
f. A flame or something used to create fire.
g. A window, or space for a window in architecture.
h. The series of squares reserved for the answer to a crossword clue.
3. POS=Adjective;
   a. Having light.
   b. Pale in colour.
   c. Coffee served with extra milk or cream.
   d. Of low weight; not heavy.
   e. Lightly-built; designed for speed or small loads.
   f. Gentle; having little force or momentum.
   g. Low in fat, calories, alcohol, salt, etc.
   h. Unimportant, trivial, having little value or significance.

The term 209 "stand" comprises the following possible LMD 202 in the dictionary 205:
1. POS=Verb;
   a. (intransitive) To be upright, support oneself on the feet in an erect position.
   b. (intransitive) To rise to one's feet; to stand up.
   c. (intransitive) To remain motionless.
   d. (intransitive) To undergo; withstand; hold up.
   e. (transitive) To tolerate.
   f. (intransitive) To place in an upright or standing position.
   g. (UK, intransitive) To seek election.
2. POS=Noun;
   a. A device to hold something upright or aloft.
   b. The platform on which a witness testifies in court; the witness stand or witness box.
   c. A position; firm opinion; action for a purpose.
   d. A particular grove or other group of trees.
   e. A small building or booth, as in a bandstand or hamburger stand.
   f. A designated spot where someone or something may stand or wait: taxi stand.

The term 209 "fire" comprises the following possible LMD 202 in the dictionary 205:
1. POS=Noun;
   a. (uncountable) A chemical reaction usually self-sustaining involving the bonding of oxygen with carbon or other fuel, with the production of heat and the presence of flame or smoldering.
   b. (countable) Something that has produced or is capable of producing this chemical reaction, such as a campfire.
   c. (countable) The, often accidental, occurrence of fire in a certain place leading to its full or partial destruction.
   d. (uncountable, alchemy) One of the four basic elements.
   e. (India and Japan) One of the five basic elements.
   f. (countable, UK) A heater or stove used in place of a real fire such as an electric fire.
   g. (countable) The elements necessary to start a fire.
   h. (uncountable) The in-flight bullets or other projectiles shot from a gun.
2. POS=VERB;
   a. (transitive) To set something on fire.
   b. (transitive) To shoot a gun or other explosive propelled device.
   c. (transitive) To terminate the employment contract of an employee, usually because of the misconduct or poor performance of the employee as opposed to "make redundant" or "lay off", where the employee's actions are not the reason for the termination.
   d. (transitive) To heat pottery, ceramic, etc., usually in a kiln to make the clay non-soluble or to affix a glaze.
   e. (intransitive) To shoot a gun, a cannon or a similar weapon.
   f. (intransitive, physiology) To cause an action potential in a cell.

The EC database 206 comprises the following:
1. Emergent categories (EC):
   EC1 contains:
   (Term=man: POS=NOUN: Sense=1)
   (Term=woman: POS=NOUN: Sense=x)
   (Term=person: POS=NOUN: Sense=y)
   (Term=speaker: POS=NOUN: Sense=z)
   <more>.
   EC2 contains:
   (Term=light: POS=VERB: Sense=1)
   (Term=ignite: POS=VERB: Sense=x)
   <more>.
   EC3 contains:
   (Term=fire: POS=NOUN: Sense=1)
   (Term=grill: POS=NOUN: Sense=x)
   (Term=bonfire: POS=NOUN: Sense=y)
   <more>.
   EC4 contains:
   (Term=stand: POS=NOUN: Sense=1)
   (Term=dais: POS=NOUN: Sense=x)
   (Term=pulpit: POS=NOUN: Sense=y)
   <more>.
2. Correspondence functions:
   Correspondence function CF1, with CF Type 303 of subject-verb, wherein role1=Emergent category EC1 and role2=EC2.
   Correspondence function CF2, with CF Type 303 of TOP-on: location-OOP, wherein role1=EC1 and role2=EC4.
   Correspondence function CF3, with CF Type 303 of Verb-direct object, wherein role=EC2 and role2=EC3.

The natural language sentence 201 "The man on the stand lit a fire" undergoes basic linguistic preprocessing to identify the phrase structure and the possible senses. The phrase structure identified is: Noun Phrase(The Man) Preposition Phrase (on the stand) Verb Phrase(lit) Noun Phrase(a fire). Here, the subject="Man", and the Preposition="on" with OOP="stand" and TOP="man". Also, the transitive verb="lit" and the object="fire". By looking up the EC database 206, the following EC are identified:
ECs for "Man" with POS=NOUN={e.g. EC1, <more>};
ECs for "stand" with POS=NOUN={e.g. EC4, <more>};
ECs for "lit" with POS=VERB={e.g. EC2, <more>};
ECs for "fire" with POS=NOUN={e.g. EC3, <more>}.

The correspondence functions with the correspondence function type 303, role1, and role2 identified in the sample sentence are determined.
For CF Type 303=Subject-Verb:
   a. Role1=(ECs for "Man" with POS=NOUN);
   b. Role2=(ECs for "lit" with POS=VERB);
   c. The correspondence function 211 identified is CF1.
For CF Type 303=TOP-on:location-OOP:
   a. Role1=(ECs for "Man" with POS=NOUN);
   b. Role2=(ECs for "stand" with POS=NOUN);
   c. The correspondence function 211 identified is CF2.
For CF Type 303=Verb-direct object:
   a. Role1=(ECs for "lit" with POS=VERB);
   b. Role2=(ECs for "fire" with POS=NOUN);
   c. The correspondence function 211 identified is CF3.

Finally, the possible senses for the terms in the example sentence are determined from the correspondence functions identified:
- (Term=man: POS=NOUN: Sense=1);
- (Term=light: POS=VERB: Sense=1);
- (Term=fire: POS=NOUN: Sense=1);
- (Term=stand: POS=NOUN: Sense=1).

A better understanding of EC may be obtained through the following illustration: Consider a dictionary D containing a set of n words $w_1 \ldots w_n$. There exists a grammatically and semantically valid ordering of words in a set U, $\{w_i \ldots w_j\}$ with the relative position of occurrence of each word given by i<j. Also, there exists a set of senses S, $\{s_1 \ldots s_n\}$ for each word $w_i$. Suppose there is a function F such that $F(w_i \cdot s_k) = \{w_j \cdot s_h\}$, where F identifies the grammatically and semantically valid possible sense 212 pairings.

For a given $u_k$ with words $w_i$ and $w_j$, the set of grammatically and semantically valid possible sense 212 pairings $\{w_i \cdot s_k : w_j \cdot s_h\}$ are determined. For a given word sense 212 $w_i \cdot s_k$, a function F is required such that $F(w_i \cdot s_k) = \{w_j \cdot s_h\}$. EC may be used to construct the function F.

Assuming that for a given word $w_i$ in a given set U, the valid senses $w_i \cdot s_k$ are found in the dictionary D, then grammatical information such as POS may be used to restrict the set of valid senses in a given set U. Restricting the set of valid senses may result in zero, one, or many possible pairing in $w_i \cdot s_k : w_j \cdot s_h$. However, if a valid paring is not possible, the dictionary D may need to be expanded.

An emergent category comprises a set of categories $C_{j \ldots k}$, wherein each of the categories comprises member senses common to the other categories in the set. The member senses of the categories largely overlap and tend to correspond as a group to a set of other categories. The membership of a sense 212 $w_i \cdot s_k$ in one or more of the categories in an emergent category implies membership of the sense 212 $w_i \cdot s_k$ in the other categories in the emergent category. Category membership of the sense 212 may be verified with other senses in the ENS 204a for $w_i \cdot s_k$.

Assume there exists a correspondence function $CO_{ij}$ such that for correspondence between two categories $c_i$ and $c_j$, i.e. $CO_{ij}(c_i, c_j)$, the respective members of $c_i$ and $c_j$ may form valid pairings {ci.wi.sk:cj.wj.sh}. For each valid sense 212 wi.sk, considering two cases:

Case 1: The sense 212 wi•sk already belongs to one or more categories $c_{i \ldots j}$. In this case function F is defined by:
1) Deriving the possible valid parings $\{c_i.w_i.s_k : c_j.w_j.s_h\}$ using each corresponding $CO_{ij}$.
2) Inferring other valid $CO_{ij}$ and hence more possible valid parings $\{c_i.w_i.s_k : c_j.w_j.s_h\}$ using "EC".

Case 2: The sense 212 $w_i$•$s_k$ does not belong to any of the categories.
There may exist only one grammatically valid sense 212 $w_i.s_k$ and one $w_j.s_h$ pairing combination possible. In this case function F is defined by:
1) Assuming $w_i.s_k : w_j.s_h$ is a valid pairing, adding $w_i.s_k$ to:
   a. The appropriate category ci whose member senses have a correspondence with $w_j.s_h$; and to
   b. All categories $c_{j \ldots k}$ in the EC where $c_i$ is a member.
   c. However, if no appropriate category $c_i$ exists, i.e. a category with member senses having correspondence with $w_j.s_h$, then creating two new categories, $c_i$ for $w_i.s_k$ and $c_j$ for $w_j.s_h$, such that correspondence function $CO(c_i, c_j)$ establishes the pairing $w_i.s_k : w_j.s_h$.

There may exist more than one grammatically valid pairing possible. In this case, each pair-wise combination is treated as a valid pairing and handled as case 2 above. However, if there is no grammatically valid pairing possible, either the pairing may be rejected as meaningless or the words in the dictionary D may be extended with the new senses $w_i.s_k$ and $w_j.S_h$, and handled as above.

Figure 2:
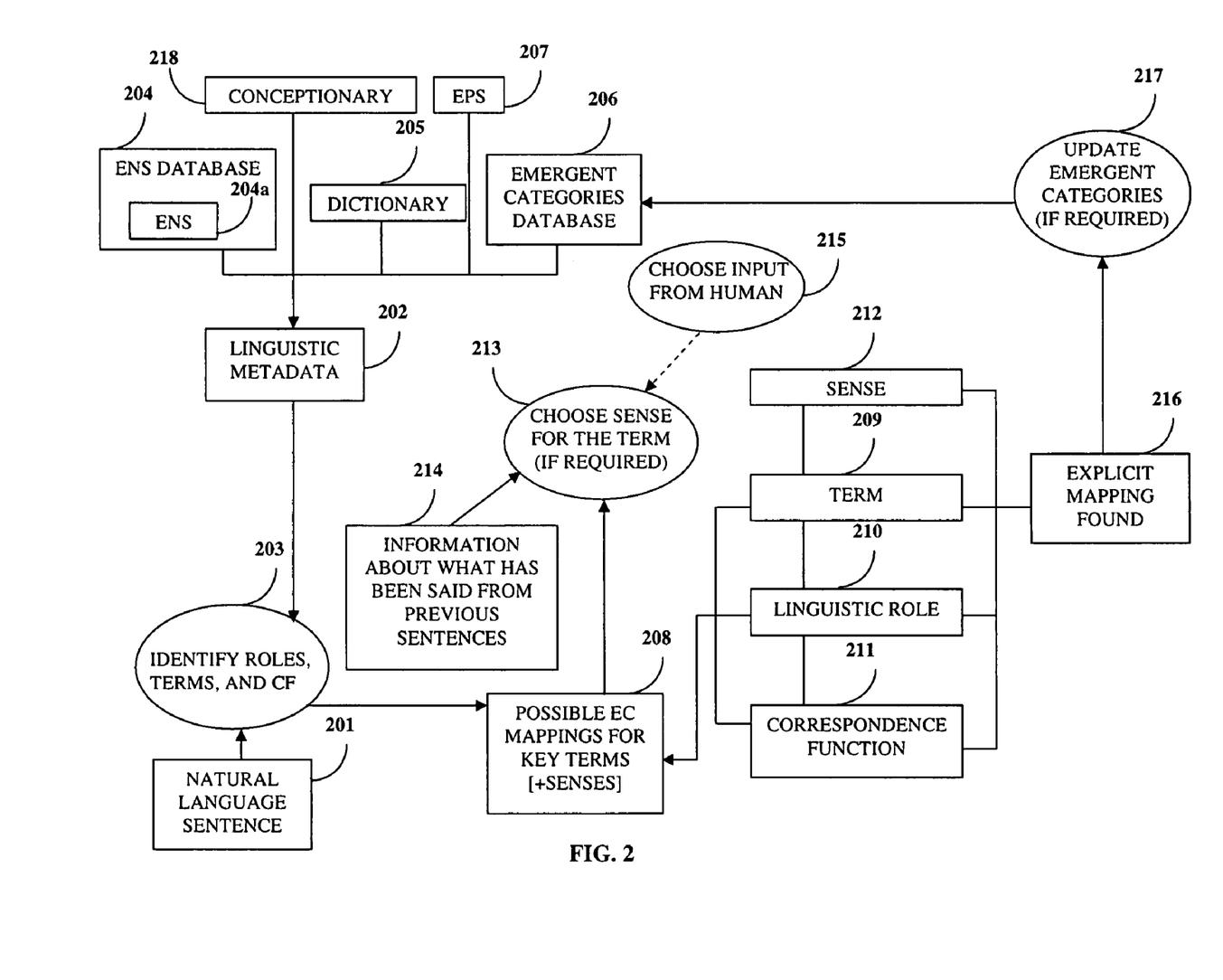
FIG. 2 exemplarily illustrates the process involved in word sense disambiguation using emergent categories.

FIG. 2 illustrates the process involved in word sense disambiguation (WSD) using EC. The use of EC to perform WSD also provides a process of growing and refining the EC DB 206. Growing and refining the EC DB 206 provides for increasing accuracy in identification of the sense 212 for a term 209 in the natural language sentence 201. Once the sense 212 for the term 209 has been identified, the "Update EC" process updates 217 any newly seen or derived EC to the EC database 206.

The LMD 202 provides linguistic information specific to each sense 212 of each term 209 in the language. Linguistic information includes gender, tense, number, POS, and word class from the dictionary 205. Linguistic information further includes the ENS 204a identity representing the ENS 204a for the sense 212 of the term 209 from the ENS database 204 and the set of EC including the sense 212 of the term 209 from the EC DB 206.

Identifying 203 roles, terms, and CF 211 may be performed using software or manually. The natural language sentence 201 is examined and the possible EC mappings for key terms 208 are identified such as:
1. Linguistic roles such as subject, object, indirect object, verb, target of the preposition, preposition, object of the preposition, etc.
2. The specific terms 209 in each role.
3. The appropriate CF 211 for each term 209 with a role. For example, "subject-verb" CF, "object-verb" CF, etc. for each possible EC mapping for key terms 208 [+senses].

A possible EC mapping is a pair-wise mapping of terms that corresponds to the CF 211. In addition, EC information obtained from the LMD 202 is applied to attempt to identify the actual or probable sense 212 of the term 209. Further processing by choosing 213 sense 212 for the term 209 may be required to find or confirm the identified 203 sense 212 of the term 209.

ENS 204a is a set of senses that acceptably mean the same. The dictionary 205 specifies terms and their senses. The dictionary 205 specifies the gender, tense, number, POS, and word class of each sense 212. EC are stored in an EC database 206 and may be provided as part of the LMD 202 for use in word sense disambiguation. The EPS 207 represent different ways the natural language sentence 201 may be represented in terms of sequence, morphology, and grammatical structure and yet retain the same core meaning.

A term 209 is word or sequence of words that when taken together identify a single sense 212 in the dictionary 205. Linguistic role 210 includes subject, object, indirect object, verb, target of the preposition, preposition, and object of the preposition and are identified 203 by generating DP after the chunking of the natural language sentence 201. The CF 211 identifies one kind of relationship between two terms in the natural language sentence 201 such as "subject-verb", "verb-object", "verb-indirect object", and "target-<preposition>-object". The symbol "<preposition>" may be any preposition in the language. The sense 212 is represented in the dictionary 205 as a single meaning for the term 209. The sense 212 has LMD 202 including gender, tense, number, POS, and word class.

The sense 212 for the term 209 is chosen 213 using the EC in the LMD 202 to determine the sense 212 of the term 209 in the natural language sentence 201. In addition, the information about what has been said from previous sentences 214 may be used to select the sense 212 of the term 209 in the natural language sentence 201. Information from previous sentences 214 may contain CF 211 mappings from previous sentences and also refer to the term 209 or semantically related term 209 in the natural language sentence 201. Also, the information from the previous sentences 214 represents a form of local semantic context. The information from the previous sentences 214 is collected from previous sentences of the current document. If a determination of the sense cannot be made from the information from the previous sentences 214, then a choice may be provided to choose 215 the sense by the user or from any other source of WSD information.

"Explicit Mapping found" 216 is a structure representing the relationships resulting from sense 212, term 209, linguistic role 210, and correspondence function 211. If the EC resulting from "Explicit Mapping Found" 216 does not already exist, an EC entry is created and added to the EC DB 206, updating 217 the EC. The conceptionary 218 is a knowledge representation of items, wherein items represent concepts, instances, relationships, characteristics, values, units of measure, and manner of sets and aggregations of the items.

Figure 3:
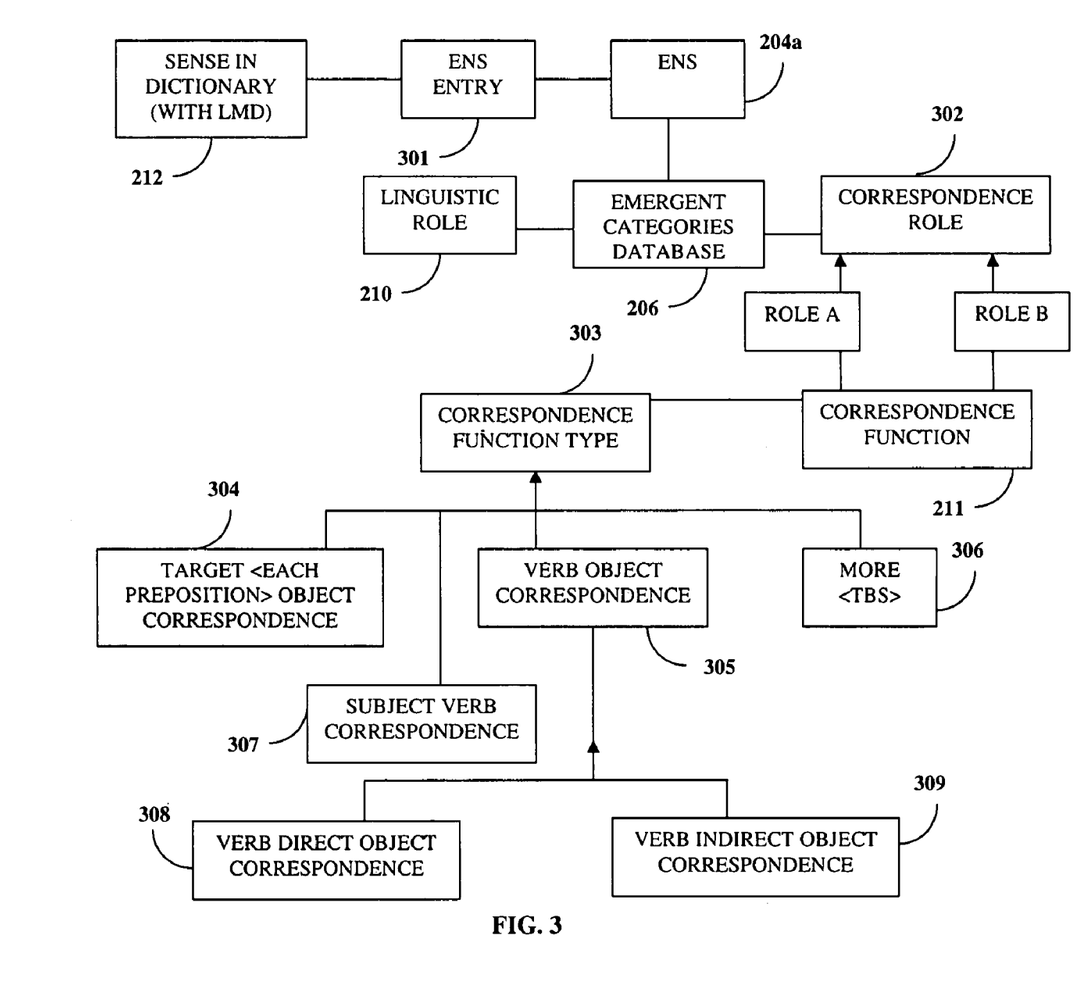
FIG. 3 exemplarily illustrates emergent categories database.

FIG. 3 exemplarily illustrates the EC database 206. An EC represents a set of equivalent name sets such that when the equivalent name sets play a given linguistic role 210 in the natural language sentence 201, they participate as a correspondence role 302 of either role A or role B in a given correspondence function 211. An EC may participate in one-to-many correspondence roles. For a given emergent category, a correspondence role 302 identifies either role A or role B in a correspondence function 211. A correspondence function 211 relates two correspondence roles and identifies their relationship by specifying the correspondence type 303. The correspondence types comprises subject verb correspondence 307, verb object correspondence 305, verb direct object correspondence 308, verb indirect object correspondence 309, target <each preposition> object correspondence 304, etc. There may be more ways of classifying pair wise linguistic relationships to form correspondence function types and an option, for example, more <TBS> 306 is provided to add more correspondence function types in the EC database 206.

An ENS entry 301 corresponds to a single sense 212 in the dictionary 205. The sense 212 in dictionary 205 with LMD 202 specifies a given meaning for a term 209 in the dictionary 205. The sense 212 has LMD 202 including gender, tense, number, POS, and word class.

The EC database 206 is a database of word sense 212 combinations where each combination represents a specific way a pair of words may correctly correspond. For example, a word with a linguistic role 210 of "subject" may correspond to another word with a linguistic role 210 of "verb" via a "subject-verb" correspondence. Similarly, there may be "Verb-Object" and "Verb-Indirect Object" correspondences. Also, correspondences may exist between the senses of the "target" and "object" of a given preposition. For example, "student of the professor" may conform to a correspondence, "target-of-object", where "student" is the target and "professor" is the object of the preposition "of". The EC database 206 stores the association in terms of the corresponding senses of the word, and not an association of merely the words.

The EC database 206 may be populated with information such as correspondence information from a number of sources and activities. The sources and activities include, but are not restricted to, parsing documents, consulting the dictionary 205 comprising sample sentences for each sense 212, consulting ontologies of a pre-existing web ontology language (Owl), and consulting pre-existing concessionaires into which the target language has been mapped.

Each of the information sources may be used to populate the EC database 206 as follows:
1. Parsing the document includes determining declared pattern (DP) for each natural language sentence 201, and adding the correspondence to the EC database 206. A declared pattern is a relative sequence of pattern units. A pattern unit is a mapping between a role in the natural language sentence 201 and its equivalent name set 204a. ENS 204a identifies a set of senses for words which mean the same.
2. Consulting the dictionary 205 includes determining DP for the sample sentences provided in the word sense 212 in the dictionary 205, and adding the correspondence to the EC database 206.
3. Translating the pre-existing conceptionary 218 to phrases and sentences by using language maps and EPS 207 and adding the correspondence to the EC database 206.
4. Using an Owl Ontology: Translating the Owl Ontology into natural language prose, determining the DP for each natural language sentence 201 read in the prose, and adding the correspondence function 211 to EC database 206.

Emergent categories (EC) and correspondence functions (CF) 211 may be generated from declared patterns (DP). A DP identifies linguistic roles for each PU. The pattern unit for specific corresponding pairs of linguistic roles may be identified. For example, if present, the respective PU for the "subject-transitive verb" pair may be identified. In addition, each PU identifies either a specific ENS 204a or literal. When two pattern units, each identifying an ENS 204a, also have linguistic roles for a valid correspondence function type 303, a new correspondence function 211 may be generated.

The emergent category containing each identified ENS 204a may be determined by the following steps:
1. For each of the two ENS 204a:
   a. For each emergent category for the ENS 204a:
      1) If the correspondence function 211 for the emergent category has the correct roles and the other ENS 204a is in the other emergent category, then:
         a) CF 211 was found;
         b) Done.
      2) If no appropriate CF 211 was found, then:
         a) Create a new CF 211 with the corresponding linguistic roles;
         b) Create a new emergent category for each ENS 204a;
         c) Associate the emergent category with the new CF 211 in their respective linguistic roles;
         d) Done.

EC and CF 211 may also be generated through reasoning by analogy, providing the ability to "guess" at word senses without having previously seen the particular use of the term 209. An EC is a set of equivalent name sets. An EC represents the senses that are known to linguistically correspond to another EC via a correspondence function 211. For example, consider the natural language sentence 201 "The boy ate the apple". There exists a "subject-verb" correspondence function 211, with role A corresponding to role B. Role A in the CF 211 has an EC, namely $EC_1$ with an ENS 204a containing the sense 212 of "boy" or "a male child". Role B has an EC, namely $EC_2$ with an ENS 204a containing the sense 212 of "ate" or "to consume". Over time, $EC_1$ containing the sense 212 of "boy" may come to participate in "subject-verb" correspondence with different emergent categories for "sleep", "speak", "die", and so on. Hence, a process of EC aggregation may be implemented.

When the equivalent name sets in $EC_1$ are known to be associated with the ENS 204a found in more than one EC, the ECs known to be associated with $EC_1$ may be merged to form a new EC. In the example sentence above, the new EC formed may represent "things that boys can do." Also, when the ENS 204a in the EC containing "boys" become part of the EC for "people", yet another new EC may be formed that represents "things that people do". In this way EC "emerge" from a combination of experience and aggregation.

An ENS 204a, namely $ENS_1$ may participate in one or more of the correspondences of a given EC, namely $EC_1$. An unprecedented correspondence between $ENS_1$ and another ENS, say $ENS_2$ may be encountered which is not known before. However, $EC_1$ may have correspondence with $ENS_2$. Thus, the same correspondence between $ENS_1$ and $ENS_2$ may also be inferred. For example, consider the natural language sentence 201 "The ATM ate my card", which is apparently correct. When the natural language sentence 201 "The ATM is sleeping" is encountered, one may infer the sense 212 of sleeping to belong to the category of things that eat also sleep. In effect, one may infer that the sense 212 of "sleep" relates to the EC that contains the sense 212 of "eat". Based on the required number of identical correspondences before making an inference, a level of accuracy may be attained. For example, requiring 75% identical correspondences before making an inference may yield less risk of being wrong than requiring only 25% of identical correspondences.

The following steps illustrate emergent category aggregation with CF 211 generation, wherein the symbol ←X→ represents "correspondence":
1. If A ←X→ B and C ←X→ B, then
  a) Let D={A, C}
  b) Create D ←X→ B
2. If A ←X→ E and C ←X→ E, then
  a) Since D={A, C}
  b) Create D ←X→ E
3. If D ←X→ B and D ←X→ E, then
  a) Let F={B, E}
  b) Create D oX→ F The following steps illustrate evident emergent category aggregation:
1. Q={A, C, G, H}
2. R={B, E, I, J}
3. If Q ←X→ R and S ←X→ E and S ←X→ B and S ←X→ I and S ←X→ J, then
  a) Q={A, C, G, H, S}

The following steps illustrate imputed emergent category aggregation with analogy match function threshold >=75%:
1. Q={A, C, G, H}
2. R={B, E, I, J}
3. If Q ←X→ R and S ←X→ E and S ←X→ B and S ←X→ I, then
  a) Assert: S ←X→ J
Therefore: Q={A, C, G, H, S}.

Figure 4:
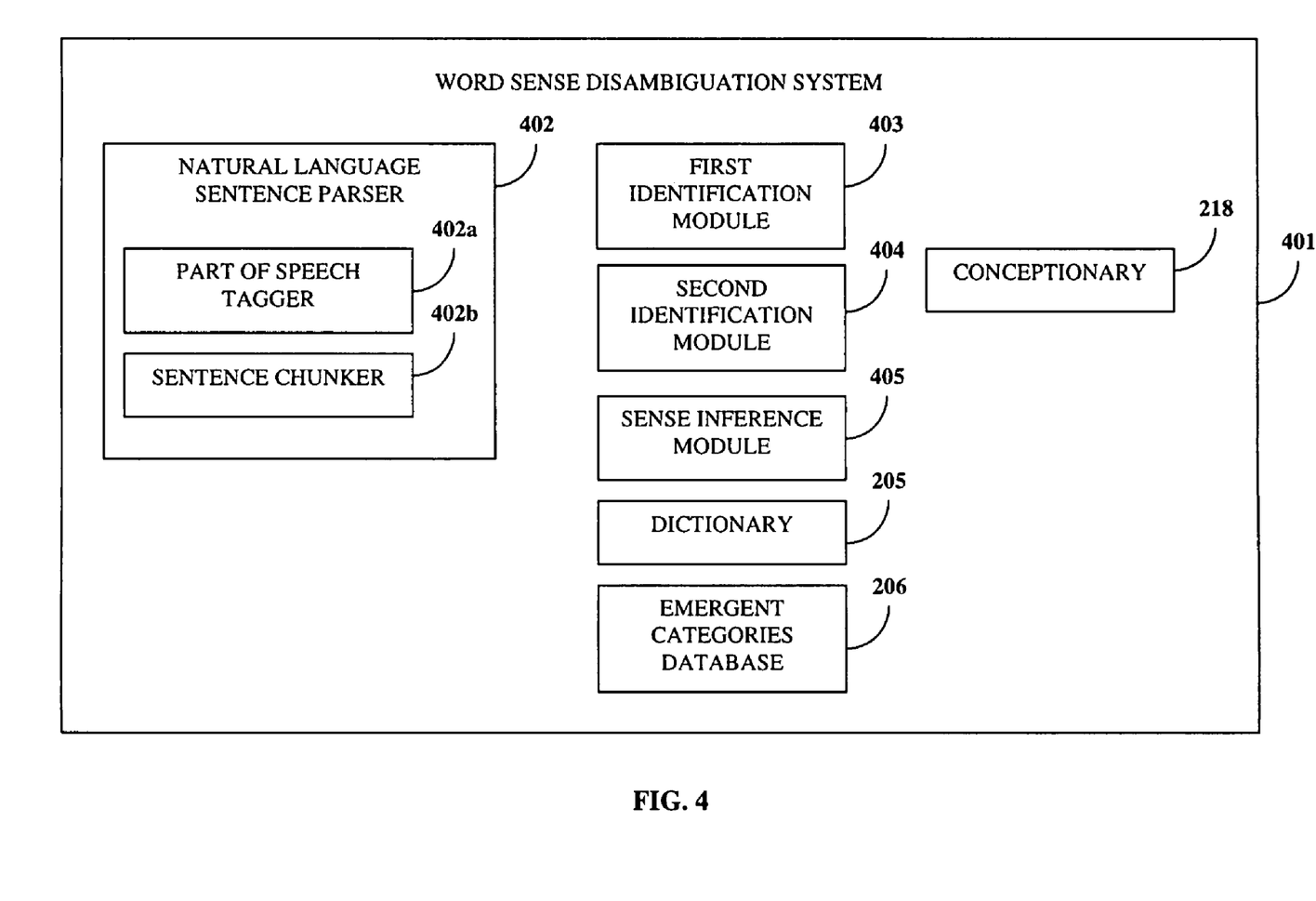
FIG. 4 illustrates a computer implemented system for word sense disambiguation in a natural language sentence.

FIG. 4 illustrates a computer implemented system for word sense disambiguation in a natural language sentence 201. The computer implemented system disclosed herein comprises a word sense disambiguation system 401. The word sense disambiguation system 401 comprises a natural language sentence parser 402, a first identification module 403, a second identification module 404, a sense inference module 405, a dictionary 205, an emergent categories database 206, and a conceptionary 218. The natural language sentence parser 402 parses the natural language sentence 201. The natural language sentence parser 402 comprises a parts of speech tagger 402a and a sentence chunker 402b. The parts of speech tagger 402a identifies the parts of speech for each term in the natural language sentence 201. The sentence chunker 402b identifies one or more possible phrase structures in the natural language sentence 201. The first identification module 403 identifies terms comprising one or more linguistic roles in the natural language sentence. The second identification module 404 identifies possible sense combinations of the identified terms with the linguistic roles in the natural language sentence. The second identification module 404 applies emergent categories to identify possible valid senses for each of the identified terms comprising the linguistic roles in the natural language sentence 201. The sense inference module 405 infers possible senses for each term with identified linguistic roles in the natural language sentence 201 and previous sentences.

The dictionary 205 comprises linguistic metadata and is used for identifying possible senses for each term with the linguistic roles in the natural language sentence. The emergent categories database 206 comprises multiple of correspondence functions. The conceptionary 218 is a knowledge representation of items. The items represent concepts, instances, relationships, characteristics, values, units of measure, and manner of sets and aggregations of the items.

Following is a discussion of examples of industrial applications of the method and system disclosed herein. The computer implemented method and system disclosed herein for word sense disambiguation (WSD) may be applied in keyword search engines for providing effective search results while searching information of interest from a document corpus since the results are concentrated around the senses of the word in which it occurs in the search pattern. For example, in response to a search string for finding web pages about "cricket", the search engine may infer whether the sense 212 of the term 209 "cricket" refers to the sport or the insect. The method may also be used in "question answering" type of information retrieval. For example, consider a question "What is George Miller's position on gun control?" The question may be analyzed to determine whether the person referred to is the psychologist or the US congressman.

The WSD method disclosed herein may also be used in machine translation, a sub-field of computational linguistics that employs computer software to translate text or speech from one natural language to another. The performance of machine translation software may be improved by inferring the sense 212 of the terms to be translated, and thereby limiting the scope of term 209 substitutions. For example, to translate "bill" from English to Spanish, the WSD method may identify whether the substitution is "pico" for bird jaw or "cuenta" for invoice.

The WSD method disclosed herein may also be used for extending knowledge base by knowledge acquisition while parsing documents. For example, the WSD method may be used to disambiguate information such as "Herb Bergson is the Mayor of Duluth" by determining whether "Duluth" refers to a city in Minnesota or Georgia.

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hardwired circuitry or custom hardware may be used in place of, or in combination with, software instructions for implementation of the processes of various embodiments. Thus, embodiments are not limited to any specific combination of hardware and software. A "processor" means any one or more microprocessors, Central Processing Unit (CPU) devices, computing devices, microcontrollers, digital signal processors, or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during Radio Frequency (RF) and Infrared (IR) data communications. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

Where databases are described, such as the emergent categories database 206 and ENS database 204, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, UltraSPARC® processors, etc. that are adapted to communicate with the computer. Any number and type of machines may be in communication with the computer.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A computer implemented method for word sense disambiguation in a natural language sentence, comprising the steps of:
    parsing, via a programmed natural language parsing module, said natural language sentence, comprising the steps of:
       identifying one or more possible parts of speech for each term in the natural language sentence;
       identifying one or more possible phrase structures in the natural language sentence;
    identifying terms comprising one or more linguistic roles in the natural language sentence by generating declared patterns;
    identifying possible sense combinations for said identified terms with said linguistic roles in the natural language sentence, comprising the steps of:
       applying emergent categories to identify possible valid senses for each of the identified terms comprising the linguistic roles in the natural language sentence, wherein said emergent categories identify a set of senses for terms in a dictionary, wherein said senses in one of the emergent categories corresponds to the senses in one of the other emergent categories by a correspondence function, wherein said correspondence function identifies a linguistic correspondence between two senses;
       providing an emergent categories database comprising a plurality of correspondence functions, wherein each of said correspondence functions comprising a given correspondence function type identifies two emergent categories, wherein said correspondence function type specifies a linguistic role pair, wherein said linguistic role pair is a pairing of two linguistic roles, wherein the senses in each of said two emergent categories play one of said two linguistic roles in the correspondence function type;
       identifying linguistic role pairs from among the identified terms with the linguistic roles in the natural language sentence for identifying pair-wise terms using said emergent categories database;

identifying the correspondence functions in the emergent categories database with correspondence function types matching said identified linguistic role pairs, wherein for each of the linguistic role pairs, the emergent categories identified by the correspondence function are valid for the corresponding linguistic roles, wherein the emergent categories specify one or more senses representing terms matching said identified pair-wise terms in the natural language sentence, wherein each sense in one of the emergent categories in said identified correspondence function is a possible valid pair-wise sense for the term in the natural language sentence when paired with the other emergent categories in the identified correspondence function;

comparing pair-wise senses for each term with the identified linguistic roles in the natural language sentence to identify said possible sense combinations; and inferring possible senses for each term with the identified linguistic roles in the natural language sentence and previous sentences;

whereby said inference of said possible senses enables word sense disambiguation in the natural language sentence.

2. The computer implemented method of claim 1, wherein the step of inferring the possible senses in the natural language sentence and said previous sentences, comprises the steps of:

reducing the possible senses for each term with the identified linguistic roles in the natural language sentence by eliminating the senses that are not consistent with pair-wise senses for the same term with the identified linguistic roles in the previous sentences; and reducing the possible senses for each term with the identified linguistic roles in the previous sentences by eliminating the senses that are not consistent with said pair-wise senses for the same term with the identified linguistic roles in subsequent sentences.

3. The computer implemented method of claim 1, further comprising the step of constructing one or more simple sentences by removing coordinating conjunctions.

4. The computer implemented method of claim 1, further comprising the step of substituting pronouns with one or more likely non-pronoun terms.

5. The computer implemented method of claim 1, wherein the emergent categories database is populated from a plurality of sources and activities comprising, parsing documents, consulting said dictionary, and using a conceptionary and ontologies of a pre-existing web ontology language, wherein said conceptionary is a knowledge representation of items, wherein said items represent concepts, instances, relationships, characteristics, values, units of measure, and sets and aggregations of the items.

6. The computer implemented method of claim 5, wherein said step of populating the emergent categories database by said parsing of said documents comprises the step of determining a declared pattern for the natural language sentence in a document and adding a correspondence function identified in said declared pattern to the emergent categories database, wherein said declared pattern is a sequence of pattern units comprising grammatical roles and the senses, wherein each of said pattern units corresponds to a portion of text in the natural language sentence.

7. The computer implemented method of claim 5, wherein said step of populating the emergent categories database by consulting the dictionary comprises the step of determining declared patterns for sentences and adding the correspondence functions identified in said declared patterns to the emergent categories database.

8. The computer implemented method of claim 5, wherein said step of populating the emergent categories database using the conceptionary comprises the step of translating the conceptionary to phrases and sentences and adding correspondence functions identified for said phrases and said sentences to the emergent categories database.

9. The computer implemented method of claim 5, wherein said step of populating the emergent categories database using said ontologies of a pre-existing web ontology language comprises translating each of the ontologies of a pre-existing web ontology language into natural language prose, parsing, determining the declared pattern for the natural language sentence in said natural language prose, and adding the correspondence function identified in the declared pattern to the emergent categories database.

10. A computer implemented system for word sense disambiguation in a natural language sentence, comprising:

a processor for executing the following system modules;
a word sense disambiguation system, comprising:
a natural language sentence parser for parsing said natural language sentence, comprising;
a parts of speech tagger for identifying parts of speech for each term in the natural language sentence;
a sentence chunker used for identifying one or more possible phrase structures in the natural language sentence;
a first identification module for identifying terms comprising one or more linguistic roles in the natural language sentence;
a second identification module for identifying possible sense combinations of said identified terms with said linguistic roles in the natural language sentence; and
a sense inference module for inferring possible senses for each term with identified linguistic roles in the natural language sentence and previous sentences.

11. The computer implemented system of claim 10, wherein said second identification module applies emergent categories to identify possible valid senses for each of the identified terms comprising the linguistic roles in the natural language sentence.

12. The computer implemented system of claim 11, wherein a dictionary with linguistic metadata is used for identifying possible senses for each term with the linguistic roles in the natural language sentence, wherein said senses in one of said emergent categories corresponds to the senses in one of the other emergent categories by a correspondence function, wherein said correspondence function identifies a linguistic correspondence between two senses.

13. The computer implemented system of claim 10, wherein said word sense disambiguation system further comprises an emergent categories database comprising a plurality of correspondence functions, wherein each of said correspondence functions comprising a given correspondence function type identifies two emergent categories, wherein said correspondence function type specifies a linguistic role pair, wherein said linguistic role pair is a pairing of two linguistic roles, wherein the senses in each of said two emergent categories play one of said two linguistic roles in the correspondence function type.

14. The computer implemented system of claim 10, wherein said word sense disambiguation system further comprises a conceptionary, wherein said conceptionary is a knowledge representation of items, wherein items represent concepts, instances, relationships, characteristics, values, units of measure, and manner of sets and aggregations of said items.

15. A computer program product comprising computer executable instructions embodied in a non-transitory computer-readable medium, wherein said computer program product comprises:
   a first computer parsable program code for parsing a natural language sentence;
   a second computer parsable program code for identifying one or more possible parts of speech for each term in said natural language sentence;
   a third computer parsable program code for identifying one or more possible phrase structures in the natural language sentence;
   a fourth computer parsable program code for identifying terms comprising one or more linguistic roles in the natural language sentence by generating declared patterns;
   a fifth computer parsable program code for identifying possible sense combinations for said identified terms with said linguistic roles in the natural language sentence; and
   a sixth computer parsable program code for inferring possible senses for each term with identified linguistic roles in the natural language sentence and previous sentences.

* * * * *